US012618972B2

(12) United States Patent
Frese et al.

(10) Patent No.: US 12,618,972 B2
(45) Date of Patent: May 5, 2026

(54) OPTICAL POSITION MEASURING DEVICE AND METHOD FOR OPERATING AN OPTICAL POSITION MEASURING DEVICE

(71) Applicant: DR. JOHANNES HEIDENHAIN GmbH, Traunreut (DE)

(72) Inventors: Daniel Frese, Traunstein (DE); Jannik Jens Rosenlehner-Emde, Obing (DE); Stefan Weis, Traunwalchen (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 861 days.

(21) Appl. No.: 17/974,961

(22) Filed: Oct. 27, 2022

(65) Prior Publication Data

US 2023/0136119 A1    May 4, 2023

(30) Foreign Application Priority Data

Oct. 29, 2021    (DE) .......................... 102021212224.8

(51) Int. Cl.
   *G01S 17/08*      (2006.01)
   *G01B 11/00*      (2006.01)
   *G01D 5/347*      (2006.01)

(52) U.S. Cl.
   CPC .............. *G01S 17/08* (2013.01); *G01B 11/00* (2013.01); *G01B 11/002* (2013.01); *G01D 5/34715* (2013.01)

(58) Field of Classification Search
   CPC ..... G01S 17/08; G01D 5/34715; G01B 11/00; G01B 11/002
   See application file for complete search history.

(56) References Cited

U.S. PATENT DOCUMENTS 5,519,483 A * 5/1996 Kawanishi ........... G03G 15/607
                                     355/75
9,200,927 B2 12/2015 Holzapfel et al.
(Continued)

FOREIGN PATENT DOCUMENTS

DE      102004024581 A1    4/2005
DE      102018104280 A1    8/2019
(Continued)

OTHER PUBLICATIONS

European Search Report issued in EP Patent Application No. EP22201035, dated Mar. 13, 2023, pp. 1-2.

*Primary Examiner* — Isam A Alsomiri
*Assistant Examiner* — Joseph C Fritchman
(74) *Attorney, Agent, or Firm* — Carter, DeLuca & Farrell LLP

(57) ABSTRACT

In an optical position measuring device for determining the position of two objects movable relative to each other along a measuring direction, a measuring standard includes a reflective measuring scale extending along the measuring direction and having scale regions with different reflectivities. A scanning unit arranged at a scanning distance relative to the measuring standard. Light source(s) and a detector arrangement including optoelectronic detector elements arranged periodically along the measuring direction are also provided. A signal processing unit is adapted to generate position signals relating to the relative position of the objects from the photocurrents generated by the detector elements, to determine a total photocurrent in a middle region and edge region(s) of the detector, and to determine the scanning distance from the photocurrent ratio of the total photocurrents formed in the middle region and edge region(s) of the detector.

19 Claims, 6 Drawing Sheets

(56) References Cited

U.S. PATENT DOCUMENTS

| | | | |
|---|---|---|---|
| 11,073,410 B2 | 7/2021 | Weis et al. | |
| 2017/0199272 A1* | 7/2017 | Takaoka | G01S 17/48 |
| 2019/0179017 A1* | 6/2019 | Nagai | G01S 7/4915 |
| 2020/0025591 A1* | 1/2020 | Hermann | G01D 5/38 |

FOREIGN PATENT DOCUMENTS

| | | | |
|---|---|---|---|
| EP | 2738524 A1 | 6/2014 | |
| EP | 3511680 A1 | 7/2019 | |
| JP | 2001-174287 A | 6/2001 | |
| JP | 2013-113634 A | 6/2013 | |
| JP | 2016-050886 A | 4/2016 | |

* cited by examiner

FIG. 5a
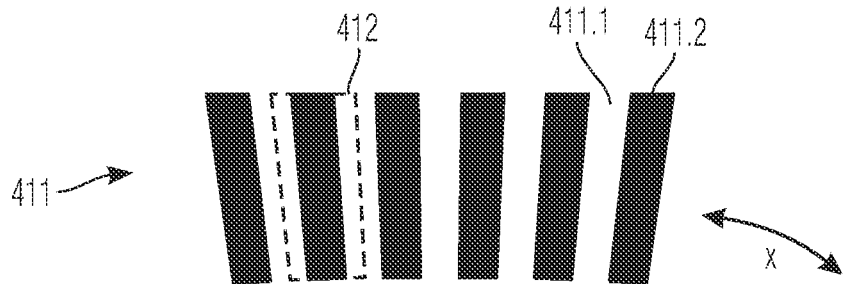
FIG. 5b
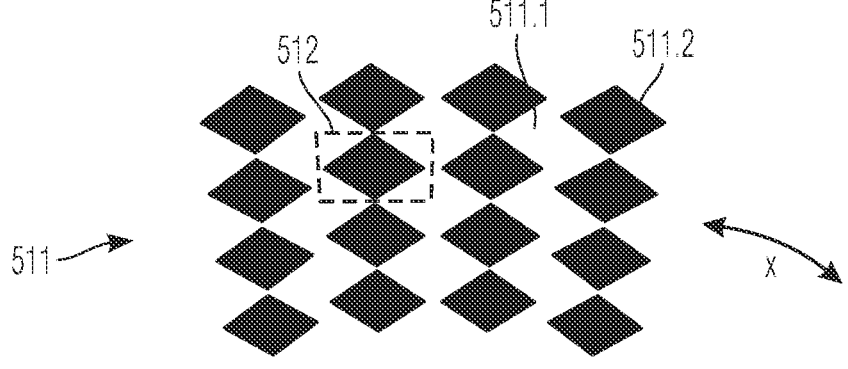
FIG. 5c

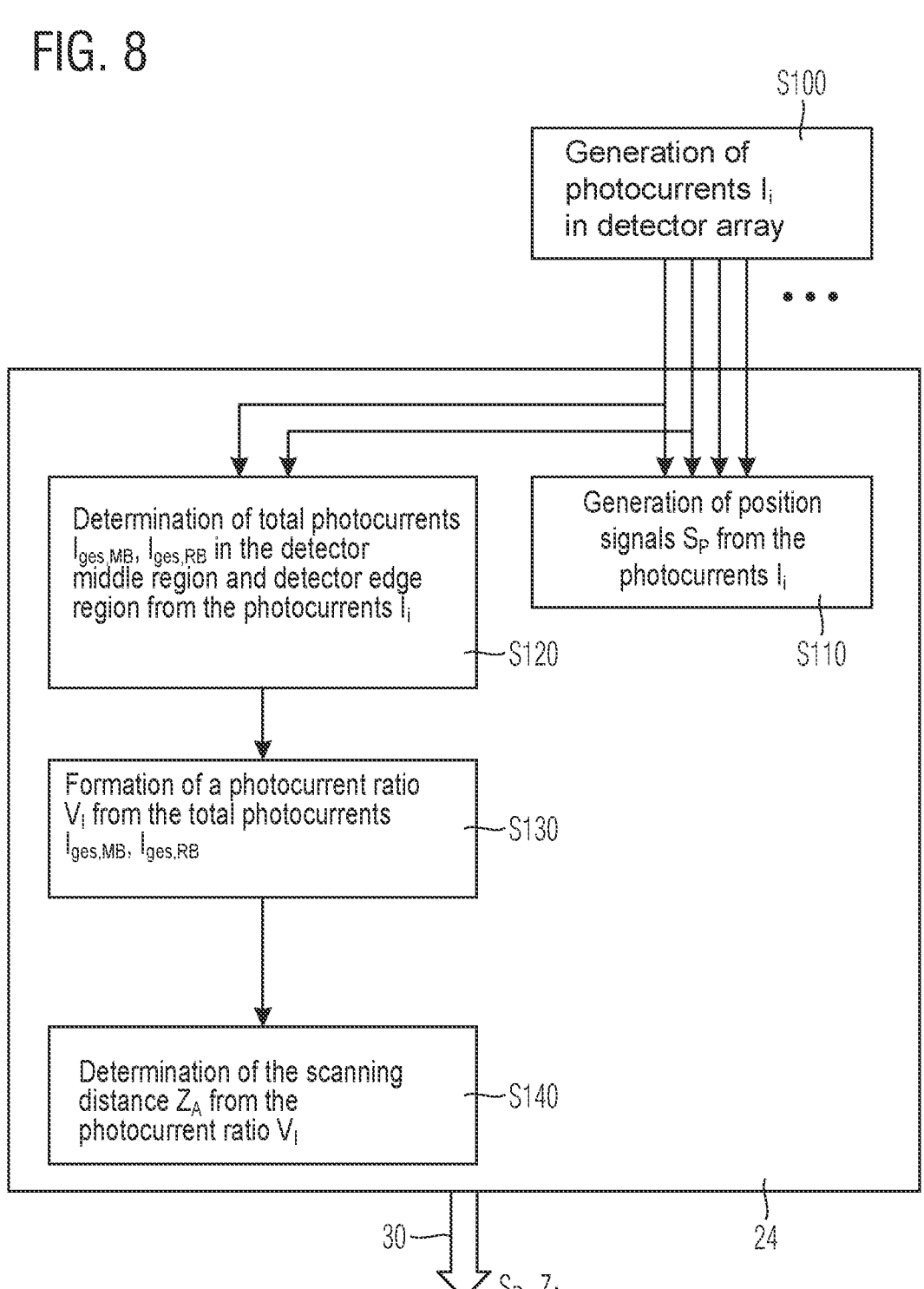

S100

Generation of
photocurrents $I_i$
in detector array

Determination of total photocurrents
$I_{ges,MB}$, $I_{ges,RB}$ in the detector
middle region and detector edge
region from the photocurrents $I_i$

S120

Generation of position
signals $S_P$ from the
photocurrents $I_i$

S110

Formation of a photocurrent ratio
$V_I$ from the total photocurrents
$I_{ges,MB}$, $I_{ges,RB}$

S130

Determination of the scanning
distance $Z_A$ from the
photocurrent ratio $V_I$

S140

30

24

$S_P$, $Z_A$

1

OPTICAL POSITION MEASURING DEVICE AND METHOD FOR OPERATING AN OPTICAL POSITION MEASURING DEVICE

CROSS-REFERENCE TO RELATED APPLICATIONS

The present application claims priority to Application No. 10 2021 212 224.8, filed in the German Patent and Trademark Office (Deutsche Patent- und Markenamt (DPMA)) on Oct. 29, 2021, which is expressly incorporated herein in its entirety by reference thereto.

FIELD OF THE INVENTION

The present invention relates to an optical position measuring device and to a method for operating an optical position measuring device, e.g., to determine the position of a first object relative to a second object. The position measuring device may include, for example, a reflective measuring scale connected to the first object and a scanning unit connected to the second object. The scanning distance between the measuring scale and the scanning unit may be determined by a signal processing unit.

BACKGROUND INFORMATION

Particularly for optical position measuring devices that work with incident light and include a measuring device having a reflective measuring scale, it is of interest to capture the scanning distance between the measuring scale and the scanning unit in addition to the actual position information. For modularly constructed position measuring devices, this information can be used during installation in the particular application, for example, in order to correctly set the scanning distance. During measuring operation, it is possible, for example, for a corresponding, rotational variant of such a position measuring device, to draw conclusions from the continuous monitoring of the scanning distance about shifting of the rotating shaft or with respect to thermal influences.

A series of approaches are conventional for determining the scanning distance in such position measuring devices.

Japanese Patent Document No. 2001-174287 describes that the light emitted by an additional light source for measuring the scanning distance is guided onto a reflector track disposed between two measuring scale tracks on a measurement scale. The reflected light impinges on a detector in the scanning unit, in which the beam diameter of the of the beam bundle impinging on the detector changes as a function of the scanning distance. The scanning distance can be estimated by an intensity measurement. With this approach, in addition to the components for measuring position, a further light source, a separate reflector track, and an additional detector are required accordingly in order to obtain the information relating to the scanning distance.

The approaches described in Japanese Patent Document Nos. 2013-113634 and 2016-050886 do not require such additional components. In this regard, the grating structure of the measuring scale is illuminated for measuring each position, and the grating self-images being formed periodically along the scanning distance direction are evaluated according to the Talbot effect. The amplitudes of the grating self-images represent the measurement of the scanning distance of interest. A disadvantage is that periodic grating structures on the measuring scale are necessary, that is, determining the scanning distance is not possible in conjunction with an aperiodic code structure. Light sources meeting particular coherence requirements are also required for these measurement methods.

A further approach is described in German Patent Document No. 10 2018 104 280, which describes using the detector both for position measurement and for determining changes in the scanning distance in reflective position measuring devices. As a measure of the change of the scanning distance, the changes in intensity and/or the location of the light reflected back from the measuring scale, as captured by the detector, are evaluated. Changes in the scanning distance can be determined at a resolution of about 0.1 mm. For monitoring the corresponding position measuring device, particularly during measuring operation, however, such a resolution for determining the scanning distance is too low. Furthermore, evaluating the light intensity for determining the distance cannot be combined well with typical methods for stabilizing the illumination of the measuring scale in a manner that is acceptable for operating the position measuring device.

SUMMARY

Example embodiments of the present invention provide an optical position measuring device and a method for operating an optical position measuring device, in which the scanning distance can be determined as precisely as possible without additional components being necessary.

According to an example embodiment of the present invention, an optical position measuring device is configured to determine the position of a first object displaceable relative to a second object along a measuring direction. A measuring standard having a reflective measuring scale extending along the measuring direction and including scale regions having different reflectivities is connected to the first object. A scanning unit is connected to the second object and is disposed at a scanning distance relative to the measuring standard. The scanning unit includes at least one light source and a detector arrangement having a plurality of optoelectronic detector elements disposed periodically along the measuring direction. The scanning unit is further associated with a signal processing unit adapted to generate position signals relating to the position of the first object relative to the second object from the photocurrents generated by the detector elements, to determine a total photocurrent in a middle region of the detector and in at least one edge region of the detector, and to determine the scanning distance from the photocurrent ratio of the total photocurrents formed in the middle region of the detector and in the edge region of the detector.

The signal processing unit may be adapted to forming the photocurrent ratio by using values of the photocurrents used to generate the position signals.

The signal processing unit may furthermore be adapted to determine a plurality of photocurrent ratios during the measuring operation, to form an average value thereof, and to determine the scanning distance from the averaged photocurrent ratio.

The signal processing unit may be adapted to determine the scanning distance from an analytical relationship and/or to determine the scanning distance from a table stored in the signal processing unit that describes the relationship between the determined photocurrent ratio and the scanning distance.

The measuring scale may include measuring scale element cells in which an area ratio of summed areas of a category of scale regions to a total area of element cells is constant, and the following relationship is satisfied:

$$0 < V_F = F_{TB1}/F_{GES} < 1,$$

$V_F$ representing the area ratio, $F_{TB1}$ representing the summed areas of the category of scale regions, and $F_{GES}$ representing the total element cell area.

The measuring scale may be arranged as an incremental scale that includes a one-dimensional, alternating arrangement of rectangular or circular ring sector shaped scale regions having different reflectivities along the measuring direction. Circular ring sector shaped scale regions may also be referred to as annulus sector shaped scale regions.

Alternatively, the measuring scale may include a two-dimensional arrangement of scale regions having different reflectivities along the measuring direction and perpendicular to the measuring direction.

The measuring scale may be arranged as a pseudo random code and may include a one-dimensional, aperiodic arrangement of rectangular or circular ring sector shaped scale regions having different reflectivities along the measuring direction.

The detector arrangement may include a one-dimensional arrangement of rectangular or circular ring sector shaped detector elements disposed adjacent to each other along the measuring direction, in which the longitudinal axes of the detector elements are oriented perpendicular to the measuring direction, and/or a two-dimensional arrangement of detector elements disposed adjacent to each other along the measuring direction and perpendicular to the measuring direction.

The light source and the detector arrangement may be located in a plane parallel to the measuring scale.

According to an example embodiment of the present invention, a method for operating an optical position measuring device, by which the position of a first object relative to a second object displaceable along a measuring direction is determined, a measuring standard connected to the first object, having a reflective measuring scale extending along the measuring direction, and including scale regions having different reflectivities is provided. Furthermore, a scanning unit connected to the second object and arranged at a scanning distance relative to the measuring standard is provided, the scanning unit including at least one light source and a detector arrangement having a plurality of optoelectronic detector elements located periodically along the measuring direction. Position signals relating to the position of the first object relative to the second object are generated by a signal processing unit associated with the scanning unit from the photocurrents generated by the detector elements. A total photocurrent is further determined in a middle region of the detector and in at least one edge region of the detector, and the scanning distance is determined from the photocurrent ratio formed of the total photocurrents in the middle region of the detector and in the edge region of the detector.

The signal processing unit may form the photocurrent ratio by using values of the photocurrents used for generating the position signals.

During the measurement operation, the signal processing unit may determine a plurality of photocurrent ratios, determine an average thereof, and determine the scanning distance from the averaged photocurrent ratio.

The signal processing unit may determine the scanning distance from an analytical relationship and/or may determine the scanning distance from a table stored in the signal processing unit that describes the relationship between the determined photocurrent ratio and the scanning distance.

The signal processing unit may use of twice as many detector elements for forming the photocurrent ratio in the middle region of the detector as in two edge regions of the detector symmetrical about the middle of the detector.

An advantage of the approach described herein is that no additional components are required for determining the scanning distance. The components already used for measuring the position can be used, such as the light source, measuring scale, and detector arrangement. Furthermore, the device and method provide that the scanning distance can be determined with sufficient precision even during measuring operations.

The position measuring device may be arranged as both a linear measuring device and a rotational measuring device, for example, in the form of a rotary encoder. The measuring scale need not necessarily be periodic.

Further features and aspects of example embodiments of the present invention are described in more detail below with reference to the appended schematic Figures.

BRIEF DESCRIPTION OF THE DRAWINGS

FIGS. 5a to 5c illustrate portions of a measuring scale for an optical position measuring device arranged as a rotational measuring device in the form of a rotary encoder.

FIG. 8 illustrates a method according to an example embodiment of the present invention.

DETAILED DESCRIPTION

Figure 1:
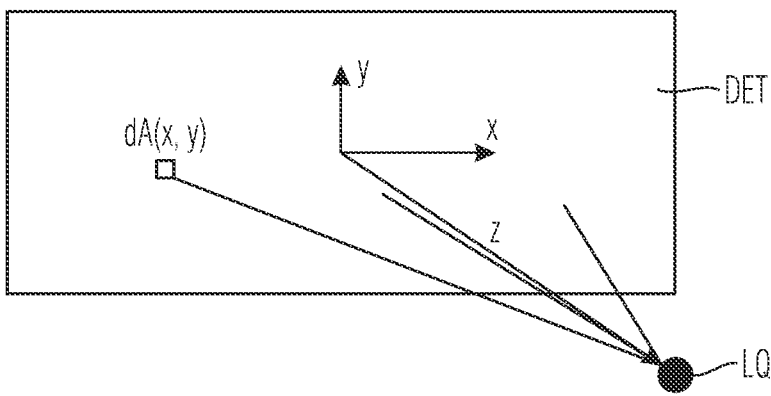
FIG. 1 illustrates the technique for determining the scanning distance.
Figure 2:
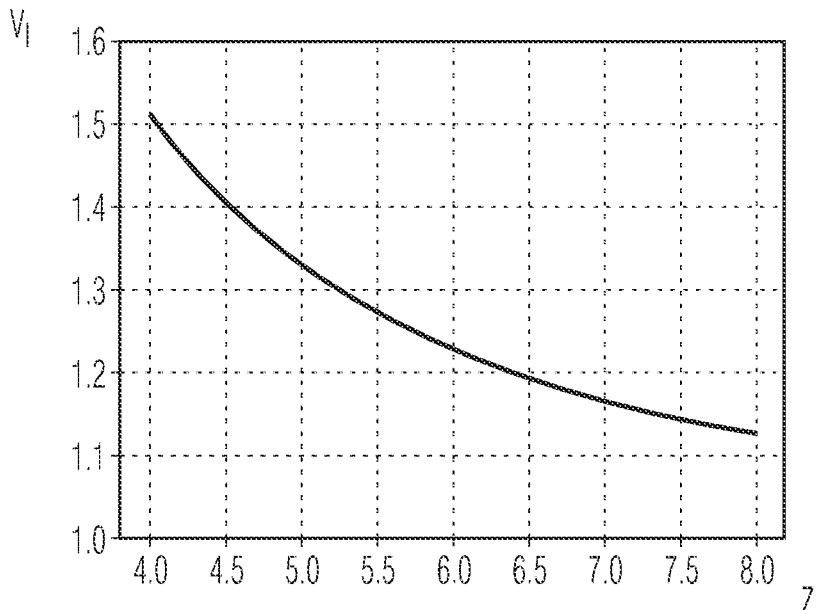
FIG. 2 illustrates the relationship between the photocurrent ratio and the scanning distance.

The technique for determining the scanning distance in an optical position measuring device illustrated in FIGS. 1 and 2 and is based on calculating the distance Z from the distance-dependent change in the non-homogenous illumination of an optoelectronic detector DET by a divergent light source LQ. The illumination of a small partial detector area $dA(x, y)$ depends on a spatial angle at which the partial detector area $dA(x, y)$ is visible from the light source LQ. The illumination also depends on the emission characteristic of the light source LQ. For the example illustrated in FIG. 1 of a light source LQ arranged as an LED having the emission characteristic of a Lambertian emitter, arranged at the location $x=0$, $y=0$, $z=0$, for example, an illumination intensity $dI$ results according to the following relationship:

$$dI \sim \frac{z^2}{\left(x^2 + y^2 + z^2\right)} \qquad \text{(Eq. 1)}$$

in which dI represents the illumination intensity, x and y represent the coordinates of a partial detector area along the orthogonal coordinate directions x, y, and Z represents the distance of the light source from the detector.

The optoelectronic detector DET generates a photocurrent that is proportional to the integral of dI over the specifically illuminated detector area. From the above relationship, the photocurrent generated for a detector area in the middle region of the detector or center of the detector, i.e., for small values of the x- and y-coordinates, is greater than for an area in the edge region of the detector for large values of the x-y-coordinates. The light intensity is thus higher in the middle of the detector DET than in the edge regions.

When fixed detector areas in the middle region of the detector and in the edge region of the detector are selected for measuring photocurrents, the ratio $V_I$ of the photocurrents of the detector areas depends only on the distance Z between the light source LQ and the detector DET. Influencing factors such as the absolute brightness of the light source LQ are eliminated by forming the ratio.

The relationship between a photocurrent ratio of photocurrents in a middle region of the detector and in an edge region of the detector and the distance Z between the light source and detector is illustrated in FIG. 2 for an exemplary arrangement of a light source and detector. The ratio $V_I$ of the photocurrent in the middle region of the detector to the photocurrent in the edge region of the detector is illustrated along the ordinate, and the distance Z between the detector and the light source along the Z-direction is illustrated along the abscissa, indicated in mm. As illustrated in FIG. 2, for a greater value of the photocurrent ratio $V_I$, i.e., for greater differences in intensity between the middle region of the detector and the edge region of the detector, a lesser distance Z is present. Conversely, for lesser differences in intensity between the middle region of the detector and the edge region of the detector, i.e., a lesser value of $V_I$, a greater distance Z is present. The lesser the distance Z, conversely, the greater the difference in intensity between the middle region of the detector and the edge region of the detector. The distance Z of interest between the light source and the detector can thus be determined by the difference in intensity between the middle region of the detector and the edge region of the detector.

For defined, specified detector areas and a known emission characteristic of the light source (such as the Lambertian emitter characteristic mentioned above), analytic relationships can be derived for the photocurrent ratio $V_I$ as a function of the distance Z and can be solved for Z using analytical or numerical methods.

For the example illustrated in FIG. 1, the detected intensity $I_i$ at the detector DET within a detection area $A_i$ having the center coordinates $x_i$, $y_i$ can be stated approximately as follows:

$$I_i = \frac{A_i Z^2}{\left(x_i^2 + y_i^2 + z^2\right)^2} \qquad \text{(Eq. 2)}$$

in which $I_i$ represents the detected intensity at the detector, $A_i$ represents the detection area, $x_i$ and $y_i$ represent the coordinates of the detection area, and Z represents the distance of the light source from the detector.

For a measured photocurrent ratio $$V_I = \frac{I_1}{I_2} > 1$$

of detected intensities $I_1$, $I_2$ on the basis of two detection areas of equal size in the middle of the detector and at the edge of the detector, the desired distance Z is thus derived based on the following relationship:

$$Z = \frac{1}{2}\sqrt{\frac{(x_2^2 + y_2^2) - \sqrt{V_I}\,(x_1^2 + y_1^2)}{\sqrt{V_I} - 1}} \qquad \text{(Eq. 3)}$$

in which $V_I$ represents the measured photocurrent ratio, $x_1$, $y_1$, $x_2$, and $y_2$ represent the coordinates of the detector areas, and Z represents the distance of the light source from the detector.

As an alternative to the foregoing, a table determined by a calibration and describing the functional relationship between the distance Z and the photocurrent ratio $V_I$ can also be saved. Such a calibration takes place prior to the actual measurement operation of the position measuring device. During the measurement operation, the distance Z in the saved table can be determined for a measured photocurrent ratio $V_I$. The distance Z corresponding to the nearest entry for the ratio $V_I$ can be read using a nearest-neighbor technique, for example, or an interpolation between the nearest entries can be performed.

Both methodologies can thus be used for determining the desired distance Z from the measurement of the photocurrent ratio $V_I$. This is exploited in the optical position measuring device for determining the scanning distance.

Figure 3:
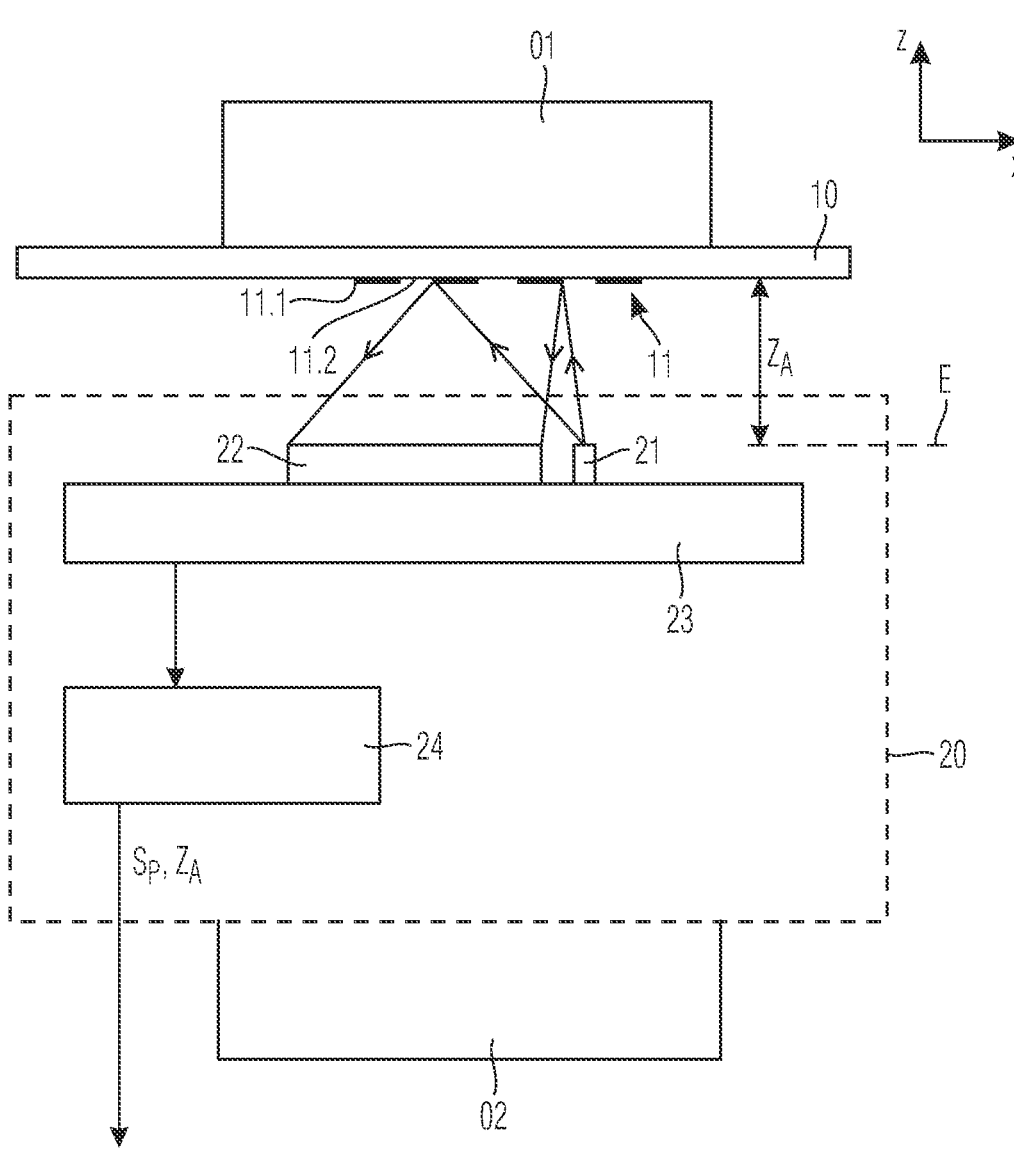
FIG. 3 is a cross-sectional view of an optical position measuring device according to an example embodiment of the present invention.

FIG. 3 is a schematic cross-sectional view of an optical position measuring device according to an example embodiment of the present invention. The corresponding position measuring device is implemented as a linear measuring device and is adapted to determine the position of a first object O1 relative to a second object O2. The first and second objects O1, O2 are disposed displaceably relative to each other along the linear measuring direction x. The objects O1, O2 may be machine components displaceable relative to each other along the measuring direction x, for example, for positioning in a defined manner by a machine controller, by the position signals $S_P$ generated by the position measuring device.

A measuring standard 10 of the position measuring device is connected to the first object O1. The measuring standard 10 includes a measuring scale 11 extending along the measuring direction x and having scale regions 11.1, 11.2 having different reflectivities disposed alternately along the measuring direction x. A wide variety of arrangements exist with respect to the measuring scale 11, both with respect to the measuring scale structure and with respect to the measuring scale configuration. The measuring scale 11 may be arranged as an incremental scale and/or as an absolute measuring scale in the form of a pseudo random code. With respect to the measuring scale configuration, it is possible to arrange the measuring scale 11 as an amplitude grating and/or as a phase grating. In the case of an amplitude grating, the scale regions 11.1, 11.2 may be arranged as highly reflective and slightly reflective (or non-reflective). If the measuring scale 11 is implemented as a phase grating, different phase shifting effects on the reflected beam bundle result in the different scale regions 11.1, 11.2, i.e., the different scale regions have different phase deviations $\Delta 1$, $\Delta 2$. Further details of the measuring scale 11 are described below.

A scanning unit 20 associated with further components of the position measuring device is connected to the second object O2. At least one light source 21 and a detector arrangement 22 are provided. The light source 21 and the detector arrangement 22 are disposed on a common support 23 in the scanning unit 20, for example. As illustrated in FIG. 3, the light source 21 and the detector arrangement 22 are jointly arranged in the scanning unit 20 together in a plane E parallel to the measuring scale 11. The detection plane of the detector arrangement 22 and the emission plane of the light source 21 are disposed in the same plane E. The light source 21 and the detector arrangement thus have same distance from the measuring scale 11, and the distance between the plane E and the measuring scale is defined as the scanning distance $Z_A$.

An LED (light emitting diode) is provided in the scanning unit 20 as the light source 21, for example, and emits radiation at a wavelength of approximately 850 nm. The light source 21 has no upstream collimation optics, i.e., the measuring scale 11 is illuminated divergently by the light source 21.

The detector arrangement 22 includes a plurality of opto-electronic detector elements such as photodiodes arranged at least periodically along the measuring direction x. Modulated photocurrents $I_i$ are generated by the detector elements from the scanning of a pattern resulting from the imaging of the measuring scale 11 in the detection plane during the relative motion of the measuring standard 10 and the scanning unit 20, and are utilized for generating position signals $S_P$ with respect to the position of the first object O1 relative to the second object O2, for example.

A signal processing unit 24 is further associated with the scanning unit 20 and undertakes a series of functions that are described in more detail below, including generating position signals $S_P$ from the photocurrents $I_i$ of the detector elements and determining the scanning distance $Z_A$ of interest. In the illustrated example, the signal processing unit 24 is provided in the scanning unit 20, but this is not required, e.g., the signal processing unit 24 may also be integrated in a machine controller connected downstream of the position measuring device, for example.

The optical position measuring device is arranged, for example, as an incident light system. The beam bundles emitted divergently by the light source 21 impinge on the reflective measuring scale 11 and are reflected back in the direction of the detector arrangement 22, as illustrated in FIG. 3. Unlike the arrangement of the light source LQ and detector DET illustrated in FIG. 1, the detector arrangement 22 is not directly illuminated, but rather the light is reflected back onto the detector arrangement 22 by the structures of the measuring scale 11. For such scanning, the divergent illumination of the measuring scale 11 and the associated projection effect results in a magnified image of the structures of the measuring scale 11 on the detector arrangement 22. Because the light source 21 and the detector 22 in the position measuring device are jointly disposed in a plane E parallel to the measuring scale 11 in the scanning unit 20 and thus have the same scanning distance $Z_A$ from the measuring scale 11, an image of the scale structures results having a magnification factor of 2, independently of the scanning distance $Z_A$ in the detection plane. It is further noted that, due to the back reflection of the light by the measuring scale 11 onto the detector arrangement 22, unlike that illustrated in FIGS. 1 and 2, double the scanning distance $Z_A$ is first determined from the determined photocurrent ratio between the middle region of the detector and at least one edge region of the detector.

In order to utilize the technique described in connection with FIGS. 1 and 2, in the optical position measuring device for determining the scanning distance $Z_A$ from the photocurrent ratio $V_I$ between the center of the detector and at least one edge region of the detector, it may be provided that certain prerequisites are met by the measuring scale 11 and/or by the detector arrangement 22, and that particular measures are taken. This is explained in greater detail below with reference to FIGS. 4a to 7b.

Figure 4A:
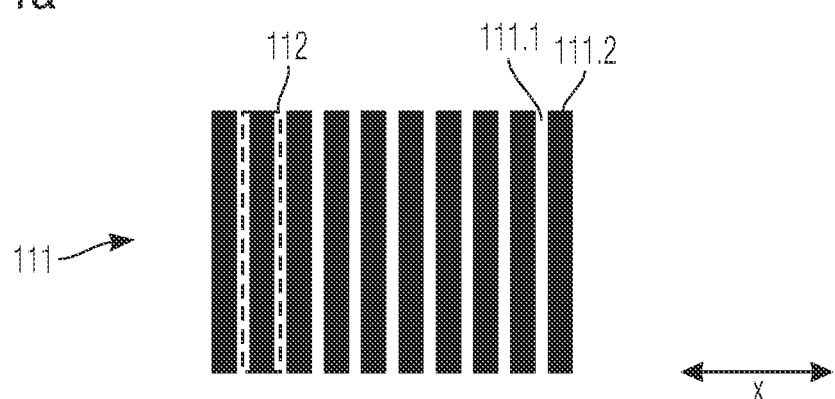
FIGS. 4a to 4c illustrate portions of a measuring scale for an optical position measuring device arranged as a linear measuring device.
Figure 4B:
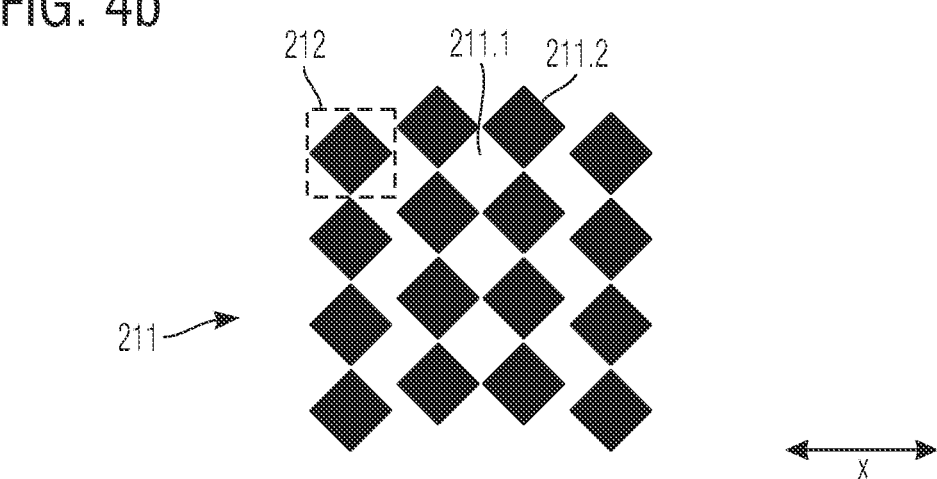
Figure 4C:
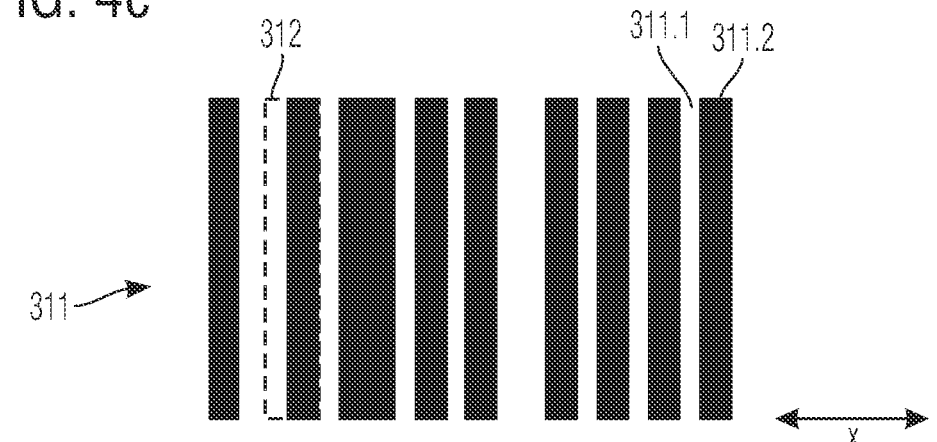

For example, the measuring scale used in the optical position measuring device is first described. FIGS. 4a to 4c are partial views of exemplary embodiments of measuring scales 111, 211, 311 for position measuring devices arranged as a linear measuring device. FIGS. 5a to 5c are partial views of measuring scales 411, 511, 611 for use in rotational or angular position measuring devices, i.e., in rotary encoders, for example.

The various measuring scales are implemented as amplitude gratings, in which higher-reflecting scale regions are illustrated as dark regions, and less-reflecting scale regions are illustrated as light regions. As mentioned above, it is also possible to arrange the measuring scales as phase gratings. In this instance, the light and dark regions represent scale regions having different phase-shifting effects.

FIGS. 4a and 5a illustrate measuring scales 111 and 411 arranged as an incremental scale and including a one-dimensional, alternating arrangement of rectangular or circular ring sector shaped scale regions 111.1, 111.2 or 411.1, 411.2 having different reflectivities along the measuring direction x. For the measuring scale 111 illustrated in FIG. 4a for a linear measuring device, the measuring scale x extends linearly along the direction along which the measuring scale 111 and the scanning unit are displaceable relative to each other. For the measuring scale 411 of a rotary encoder illustrated in FIG. 5a, the measuring direction x extends, as illustrated, annularly about an axis of rotation, about which the measuring scale 411 and scanning unit are rotatable relative to each other.

FIGS. 4b and 5b illustrate further measuring scales 211 and 511 that may be utilized for linear measuring devices and rotary encoders. A two-dimensional arrangement of scale regions 211.1, 211.2 and 511.1, 511.2 having different reflectivities along the measuring direction x and perpendicular to the measuring direction x is provided. The scale regions 211.1, 211.2 and 511.1, 511.2 of the measuring scales 211, 511 are arranged approximately in a diamond shape. The corresponding contours of the scale regions 211.1, 211.2 are not necessarily linear, but may be curved in the shape of a cosine, whereby a reduction in undesired harmonics in the generated position signals is achieved. Such measuring scales 211, 511 and the scanning of such measuring scales 211, 511 are described, for example, in European Patent Document No. 3 511 680 and U.S. Pat. No. 11,073,410, each of which is expressly incorporated herein in its entirety by reference thereto.

FIGS. 4c and 5c illustrate measuring scales 311 and 611 for linear measuring devices and rotary encoders arranged as pseudo random codes and including a one-dimensional, aperiodic arrangement of rectangular or circular ring sector shaped scale regions 311.1, 311.2 and 611.1, 611.2 having different reflectivities along the measuring direction x.

The structures present in the scanned measuring scale and necessary for determining the position fundamentally disturb the determination of the scanning distance $Z_A$ according to the technique explained above. The reason for this is that in the case of a relative motion of the measuring scale and scanning unit, the photocurrent ratio $V_I$ to be formed is also influenced, i.e., the photocurrent ratio $V_I$ is not exclusively dependent on the scanning distance $Z_A$. By a suitable configuration of the measuring scale, however, the interference with the determination of the scanning distance may be substantially reduced. It is thus provided that the area ratio $V_F$ of the summed areas $F_{TB1}$ of highly reflective scale regions to the total element cell area $F_{GES}$ is constant in the measuring scale element cells continuously forming the particular measuring scale for the case of a measuring scale arranged as an amplitude grating. FIGS. 4a to 4c and 5a to 5c illustrate, as a dashed line, a representative measuring scale element cell 112, 212, 312, 412, 512, 612 of the corresponding measuring scale 111, 211, 311, 411, 511, 611 subject to this condition.

In the analogous case of a measuring scale arranged as a phase grating, for example, the area ratio of the summed areas $F_{TB1}$ of measuring scales having the phase deviation $\Delta1$ to the total element cell area $F_{GES}$ is selected as constant, etc.

The area ratio $V_F$ may satisfy the relationship, $0<V_F=F_{TB1}/F_{GES}<1$, in which $V_F$ represents the area ratio, Fri represents the summed areas of a category of scale regions, and Fees represents the total element cell area. For example, $V_F\approx0.5$ may be provided.

Each measuring scale element cell 112, 212, 312, 412, 512, 612 encloses only a small spatial angle as seen from the light source. Using the approximation-under the present circumstances for light sources arranged as LEDs—that the emission characteristic of the light source is constant over the spatial angle, the total amount of light reflected due to an arbitrarily structured measuring scale element cell 112, 212, 312, 412, 512, 612 corresponds to the amount of light that the same measuring scale element cell 112, 212, 312, 412, 512, 612 would reflect at an average, constant reflectivity without structuring. Assuming that all of the light of a measuring scale element cell 112, 212, 312, 412, 512, 612 is captured by the detector arrangement, the initially interfering influence of the structuring averages out within a measuring scale element cell 112, 212, 312, 412, 512, 612 and the corresponding measuring scale 111, 211, 311, 411, 511, 611 acts like a mirror having reduced but constant reflectivity. The technique describe above can thus be used despite the structures present in the measuring scales 111, 211, 311, 411, 511, 611 in order to determine the scanning distance $Z_A$ from the photocurrent ratio $V_I$ between a middle region of the detector and at least one edge region of the detector.

Figure 6A:
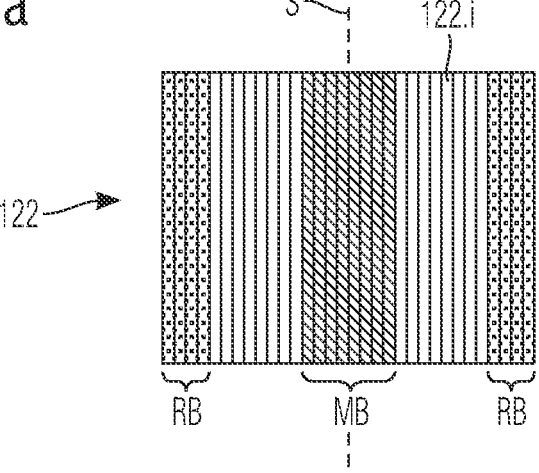
FIGS. 6a and 6b illustrate detector arrangements for an optical position measuring device arranged as a linear measuring device.
Figure 6B:
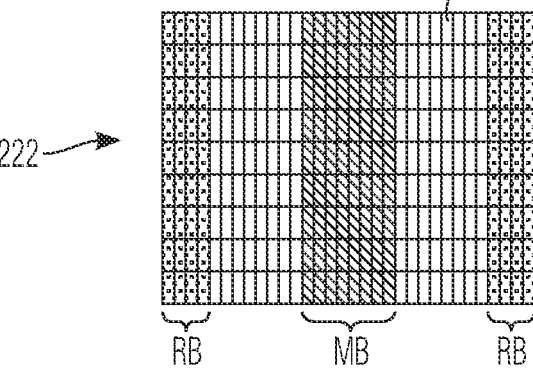
Figure 7A:
FIGS. 7a and 7b illustrate detector arrangements for an optical position measuring device arranged as a rotational measuring device in the form of a rotary encoder.
Figure 7A:
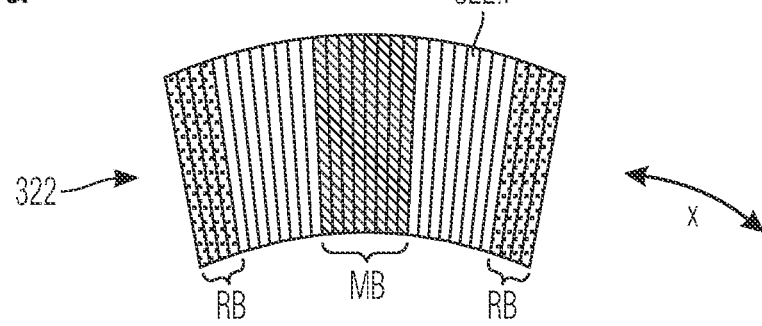
Figure 7B:
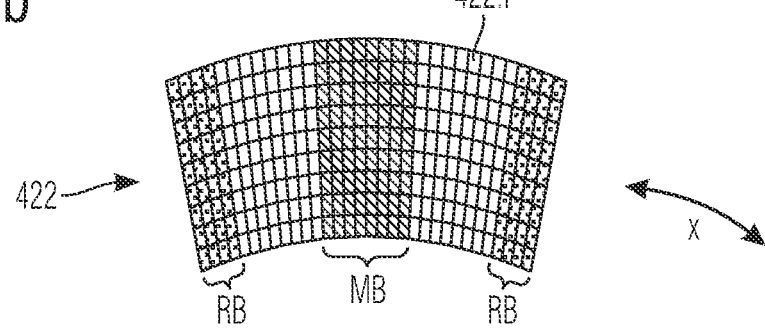

It is explained below which measures may be provided for the detector arrangement 22 in the optical position measuring device in order to implement the technique described above for determining the scanning distance $Z_A$. FIGS. 6a and 6b illustrate exemplary configurations of detector arrangements 122, 222 for position measuring devices implemented as a linear measuring device. FIGS. 7a and 7b illustrate detector arrangements 322, 422 for use in rotational or angular position measuring devices, such as rotary encoders.

FIGS. 6a and 7a are partial views of detector arrangements 122, 322 configured both for scanning incremental scales illustrated in FIGS. 4a and 5a and for scanning measuring scales having pseudo random codes illustrated in FIGS. 4c and 5c. The detector arrangement 122 illustrated in FIG. 6a may be used in linear measuring devices having a linear measuring direction x, for example in order to scan the measuring scale illustrated in FIG. 4a or 4c. The detector arrangement 322 illustrated in FIG. 7a may be used in rotary encoders, in which the measuring direction x extends annularly about an axis of rotation. That is, the detector arrangement 322 may be used for scanning the measuring scale illustrated in FIG. 5a, for example.

The detector arrangement 122 configured for use in linear measuring devices illustrated in FIG. 6a includes a one-dimensional arrangement of a plurality of identically configured, rectangular detector elements 122.i arranged adjacent to each other periodically along the linear measuring direction x. The longitudinal axes of the detector elements 122.i are oriented perpendicular to the measuring direction x, as illustrated.

The detector arrangement 322 configured for use in rotary encoders illustrated in FIG. 7a includes a one-dimensional arrangement of a plurality of annular detector elements 322.i located adjacent to each other periodically along the annular measuring direction x. The longitudinal axes of the detector elements 322.i are oriented perpendicular to the measuring direction x, as illustrated.

The detector arrangements 222, 422 illustrated in FIGS. 6b and 7b may be used for scanning the measuring scales 211, 511 illustrated in FIGS. 4b and 5b.

The detector arrangement 222 configured for use in linear measuring devices illustrated in FIG. 6b includes a two-dimensional arrangement of a plurality of detector elements 222.i located adjacent to each other along the linear measuring direction x and perpendicular to the measuring direction x. The measuring scale illustrated in FIG. 4b may be scanned by detector arrangement 222.

The detector arrangement 422 illustrated in FIG. 7b is configured for use in rotary encoders and includes a two-dimensional arrangement of a plurality of detector elements 422.i located adjacent to each other along the annular measuring direction x and perpendicular to the measuring direction x. The measuring scale 511 illustrated in FIG. 5b may be scanned by the detector arrangement 422, for example.

FIGS. 6a, 6b, 7a, and 7b illustrate for each of the detector arrangements 122, 222, 32, 422 which of the detector elements 122.i are used in order to determine the total photocurrents $I_{ges,MB}$, $I_{ges,RB}$ in the middle region of the detector MB and in two edge regions of the detector RB required for determining the scanning distance $Z_A$ as described above. The detector elements 122.i used to this end are indicated in FIGS. 6a, 6b, 7a, 7b by different cross-hatching patterns relative to the remaining detector elements 122.i. The detector arrangement 122 illustrated in FIG. 6a and configured for use in a linear measuring device is described in more detail below.

It should be understood that it is not necessary to determine total photocurrents $I_{ges,RB}$ in two edge regions of the detector. It is also possible to use only one edge region of the detector.

In the example illustrated in FIG. 6a, eight adjacent detector elements 122.i in the detector arrangement 122 are used by the signal processing unit for determining the scanning distance $Z_A$ in the middle region of the detector, and are arranged mirror-symmetrically about the axis of symmetry S of the detector arrangement 122. The photocurrents $I_{i,MB}$ of the eight detector elements 122.i are summed to form the total photocurrent $I_{ges,MB}$ in the middle region of the detector MB. Four detector elements 122.i at each of the left and right edges of the detector arrangement 122 are used by the signal processing unit in the two corresponding edge regions RB, and the photocurrents $I_{i}$,RB thereof are summed to form a total photocurrent $I_{ges,RB}$ in the edge region of the detector. As illustrated in FIG. 6a, the four outermost detector elements 122.i in each of the left and right edge regions RB are selected. The photocurrent ratio $V_I=I_{ges,MB}/I_{ges,RB}$ is formed from the total photocurrent $I_{ges,MB}$ in the middle region of the detector MB and the total photocurrent $I_{ges,RB}$ in the edge region of the detector RB, and the scanning distance $Z_A$ is determined therefrom.

As indicated above, this can be achieved in that the relationship between the photocurrent ratio $V_I$ and the scanning distance $Z_A$ is saved in a table in the signal processing unit, according to the relationship illustrated in FIG. 2.

The number of detector elements 122.i used for determining the total photocurrents $I_{ges,MB}$, $I_{ges,RB}$ in the middle region of the detector MB and in the edge regions of the detector RB of the detector arrangement 122 is, for example, determined as a function of the imaging or projection of the scale structure in the detection plane. The number of detector elements 122.i in the middle region of the detector MB and in the edge region of the detector RB is determined so that whole-number multiples (n=1, 2, 3 . . . ) of the measuring scale element cells projected into the detection plane are detected. Because four detector elements 122.i are provided per measuring scale element cell for generating position signals $S_P$ in the form of four incremental signals at a phase offset of 90° due to the single field scanning provided, (n=1)×4=4 detector elements 122.i are used in each of the two edge regions of the detector RB for forming the total photocurrent $I_{ges,RB}$, and (n=2)×4=8 detector elements 122.i are used in the middle region of the detector MB for forming the total photocurrent $I_{ges,MB}$, as illustrated in FIG. 6a. Consequently, altogether the same number of detector elements 122.i is used from the middle region of the detector MB as from the two edge regions of the detector RB for forming the photocurrent ratio $V_I=I_{ges,MB}/I_{ges,RB}$ and thus for determining the scanning distance $Z_A$. In other words, in the present example embodiment, photocurrents from the same number of scanned measuring scale element cells are used in the middle region of the detector MB and in the two edge regions of the detector RB for determining $V_I$. It should be understood that using the same number of measuring scale element cells used in the middle region of the detector and in the edge region of the detector is not necessary.

Values of the photocurrents $I_{i,MB}$, $I_{i,RB}$ of selected detector elements 122.i are used accordingly by the signal processing unit for determining the photocurrent ratio $V_I$, and the detector elements are also provided for generating the position signals $S_P$ dependent on the displacement. Corresponding values, or copies thereof, can be generated, for example, in an analog manner by the current level or by a second voltage tap downstream of a combined transformer. It is also possible to first digitize the photocurrents $I_{i,MB}$, $I_{i,RB}$ and to use the corresponding values multiple times.

The position signals $S_P$ in the form of a plurality of incremental signals are generated, e.g., in a conventional manner in the present example. Every measuring scale element cell projected onto the detector arrangement 122 is scanned by four detector elements 122.i, resulting in four incremental signals, each phase offset by 90°, in the case of a relative motion of the measuring standard and the scanning unit. The photocurrents of detector elements 122.i generating incremental signals of identical phase are summed and are further processed by the signal processing unit, e.g., in a conventional manner in order to provide two incremental signals as position signals $S_P$ for further processing on the output side, having a phase offset of 90°.

The precision may be increased further when determining the scanning distance $Z_A$ during a measuring operation, for example, if the photocurrent ratio $V_I$ is determined multiple times by the signal processing unit. The average of the plurality of determined photocurrent ratio $V_I$ is determined, and the scanning distance $Z_A$ is determined from the averaged photocurrent ratio $ØV_I$. In this manner, imprecisions in determining the scanning distance can be avoided, for example, potentially caused by local contamination of the measuring scale. Such an averaging can be performed over time, for example, in that the photocurrent ratios $V_I$ are calculated periodically and a particular number of determined photocurrent ratios $V_I$ are combined. It is also possible to obtain the average over a particular position range, in that the determined photocurrent ratios $V_I$ are combined within specified position ranges of the position measuring device and averaged, thus outputting average values for the corresponding position ranges.

In analogous manner, the same procedure is used for forming the photocurrent ratio $V_I$ for the detector arrangement 322 illustrated in FIG. 7a, which is configured for scanning the measuring scale 411 illustrated in FIG. 5a in a rotary encoder.

Similarly, detector elements 122.i in the middle region of the detector MB and the two edge regions of the detector RB are selected for use in the detector arrangements 222, 422 illustrated in FIGS. 6b and 7b for scanning the measuring scales illustrated in FIGS. 4b and 5b. As explained above with reference to FIG. 4b, for example, the measuring scale element cell 212 is approximately square. In order to scan such a measuring scale element cell projected in a diamond shape onto the detection plane, a group of 3×4 detector elements 222.i is necessary in the detector arrangement 222 illustrated in FIG. 6b, of which four detector elements 222.i are located adjacent to each other along the measuring direction x and three detector elements 222.i are located perpendicular to the measuring direction x. Therefore, 12 detector elements 222.i are necessary for each group for scanning a measuring scale element cell. Six such groups of detector elements 222.i of the detector arrangement 222 are used in the middle region of the detector MB for forming the photocurrent ratio $V_I$. Three such groups of detector elements 222.i are used in each of the edge regions RB.

For the detector arrangement 422 illustrated in FIG. 7b, an analogous procedure is followed and may be implemented in a rotary encoder for scanning a measuring scale illustrated in FIG. 5b.

A method for determining the scanning distance $Z_A$ is described below with reference to FIG. 8, which illustrates the signal processing unit 24 of the optical position measuring device and certain function blocks thereof.

According to the function block S100, photocurrents $I_i$ are generated form the light pattern projected into the detection plane by the detector arrangement of the position measuring device and are transferred to the signal processing unit 24.

The photocurrents $I_i$ are used by the signal processing unit 24 to generate position signals $S_P$ therefrom relating to the motion of the measuring standard and the scanning unit (function block S110). For example, the generated position signals $S_P$ may be two sinusoidal incremental signals having a phase offset of 90° from each other. Alternatively, however, position signals $S_P$ in the form of absolute position data may also be generated. The corresponding position signals $S_P$ are transferred to subsequent electronics via a suitable interface 30.

A portion of the photocurrents $I_i$ provided by the detector arrangements is copied and used for determining total photocurrents $I_{ges,MB}$, $I_{ges,RB}$ from a middle region of the detector and edge regions of the detector, in that photocurrents of selected detector elements are summed for this purpose (function block S120).

A photocurrent ratio $V_I$ is formed from the total photocurrents $I_{ges,MB}$, $I_{ges,RB}$ according to $V_I = I_{ges,MB}/I_{ges,RB}$ (function block S130).

The scanning distance $Z_A$ is determined from the photocurrent ratio $V_I$ as explained above (function block S140). To this end, an analytical relationship describing the relationship between $V_I$ and $Z_A$ may be used, and/or the scanning distance $Z_A$ may be determined from a table saved in the signal processing unit 24 that correlates the associated scanning distance $Z_A$ for a plurality of photocurrent ratios $V_I$.

The scanning distance $Z_A$ thus determined may also be output by the interface 30 to subsequent electronics for further processing.

It is possible to visualize the determined scanning distance $Z_A$ by a display unit in order to provide assistance for correct assembly when installing the position measuring device, for example.

It may further be provided that the determined scanning distance $Z_A$ is evaluated by a suitable method and the result of such an evaluation is output to subsequent electronics, for example, in the form of an evaluation parameter, and/or is visualized by a display unit.

What is claimed is:

1. An optical position measuring device for determining a position of a first object displaceable along a measuring direction relative to a second object, comprising:
   a measuring standard connected to the first object and including a reflective measuring scale extending along the measuring direction and having scale regions having different reflectivities, and
   a scanning unit connected to the second object and arranged at a scanning distance relative to the measuring standard, including at least one light source, and a detector arrangement including a plurality of optoelectronic detector elements located periodically along the measuring direction; and
   a signal processing unit associated with the scanning unit and adapted to generate, from photocurrents generated by the detector elements, position signals relating to the position of the first object relative to the second object, to determine a total photocurrent in a middle region of the detector and in at least one edge region of the detector, and to determine the scanning distance from a photocurrent ratio formed of total photocurrents in the middle region of the detector and in the edge region of the detector.

2. The optical position measuring device according to claim 1, wherein the signal processing unit is adapted to use values of the photocurrents used to generate position signals to form the photocurrent ratio.

3. The optical position measuring device according to claim 1, wherein the signal processing unit is adapted to determine a plurality of photocurrent ratios, to produce an average of the photocurrent ratios, and to determine the scanning distance from the averaged photocurrent ratio during a measuring operation.

4. The optical position measuring device according to claim 1, wherein the signal processing unit is adapted to determine the scanning distance from an analytical relationship.

5. The optical position measuring device according to claim 1, wherein the signal processing unit is adapted to determine the scanning distance from a table stored in the signal processing unit that describes a relationship between the determined photocurrent ratio and the scanning distance.

6. The optical position measuring device according to claim 1, wherein the measuring scale includes measuring scale element cells in which an area ratio of summed areas of a category of scale regions to a total area of element cells is constant, and the following relationship is satisfied:

$$0 < V_F = F_{TB1}/F_{GES} < 1,$$

$V_F$ representing the area ratio, $F_{TB1}$ representing the summed areas of the category of scale regions, and $F_{GES}$ representing the total element cell area.

7. The optical position measuring device according to claim 6, wherein the measuring scale is arranged as an incremental scale including a one-dimensional, alternating arrangement of rectangular or circular ring sector shaped scale regions having different reflectivities along the measuring direction.

8. The optical position measuring device according to claim 6, wherein the measuring scale includes a two-dimensional arrangement of scale regions having different reflectivities along the measuring direction and perpendicular to the measuring direction.

9. The optical position measuring device according to claim 6, wherein the measuring scale is arranged as pseudo random code including a one-dimensional, aperiodic arrangement of rectangular or circular ring sector shaped scale regions having different reflectivities along the measuring direction.

10. The optical position measuring device according to claim 1, wherein the detector arrangement includes a one-dimensional arrangement of rectangular or circular ring sector shaped detector elements located adjacent to each other along the measuring direction, longitudinal axes of the detector elements being oriented perpendicular to the measuring direction.

11. The optical position measuring device according to claim 1, wherein the detector arrangement includes a two-dimensional arrangement of detector elements located adjacent to each other along the measuring direction and perpendicular to the measuring direction.

12. The optical position measuring device according to claim 1, wherein the light source and the detector arrangement are arranged in a plane parallel to the measuring scale.

13. A method for operating an optical position measuring device by which a position of a first object relative to a second object displaceable along a measuring direction is determined, the position measuring device including a measuring standard connected to the first object and having a reflective measuring scale extending along the measuring direction and including scale regions having different reflectivities, a scanning unit connected to the second object and arranged at a scanning distance relative to the measuring standard, the scanning unit including at least one light source and a detector arrangement including a plurality of optoelectronic detector elements located periodically along the measuring direction, and a signal processing unit associated with the scanning unit, comprising:
   generating, by the signal processing unit, position signals relating to the position of the first object relative to the second object from photocurrents generated by the detector elements;
   determining, by the signal processing unit, a total photocurrent in a middle region of the detector and in at least one edge region of the detector; and
   determining, by the signal processing unit, the scanning distance from a photocurrent ratio formed of total photocurrents in the middle region of the detector and in the edge region of the detector.

14. The method according to claim 13, wherein the signal processing unit uses values of the photocurrents used to generating the position signals to form the photocurrent ratio.

15. The method according to claim 13, wherein the signal processing unit determines a plurality of photocurrent ratios, produces an average of the photocurrent ratios, and determines the scanning distance from the averaged photocurrent ratio during a measuring operation.

16. The method according to claim 13, wherein the signal processing unit determines the scanning distance from an analytical relationship.

17. The method according to claim 13, wherein the signal processing unit determines the scanning distance from a table stored in the signal processing unit that describes a relationship between the determined photocurrent ratio and the scanning distance.

18. The method according to claim 13, wherein the signal processing unit uses twice as many detector elements in the middle region of the detector as in two edge regions of the detector symmetrical to the middle region of the detector to form the photocurrent ratio.

19. An optical position measuring device for determining a position of a first object displaceable along a measuring direction relative to a second object, comprising:
a measuring standard adapted to connect to the first object and including a reflective measuring scale extending along the measuring direction and having scale regions having different reflectivities, and
a scanning unit adapted to connect to the second object and arranged at a scanning distance relative to the measuring standard, including at least one light source, and a detector arrangement including a plurality of optoelectronic detector elements located periodically along the measuring direction; and
a signal processing unit associated with the scanning unit and adapted to generate, from photocurrents generated by the detector elements, position signals relating to the position of the first object relative to the second object, to determine a total photocurrent in a middle region of the detector and in at least one edge region of the detector, and to determine the scanning distance from a photocurrent ratio formed of total photocurrents in the middle region of the detector and in the edge region of the detector.

\* \* \* \* \*